United States Patent
Mertens et al.

(10) Patent No.: US 11,941,345 B2
(45) Date of Patent: Mar. 26, 2024

(54) VOICE INSTRUCTED MACHINE AUTHORING OF ELECTRONIC DOCUMENTS

(71) Applicant: Grammarly, Inc., San Francisco, CA (US)

(72) Inventors: Timo Mertens, San Francisco, CA (US); Vipul Raheja, San Francisco, CA (US); Chad Mills, Georgetown, TX (US); Ihor Skliarevskyi, Vancouver (CA); Ignat Blazhko, San Francisco, CA (US); Robyn Perry, San Mateo, CA (US); Nicholas Bern, San Francisco, CA (US); Dhruv Kumar, Vancouver (CA); Melissa Lopez, Ewing, NJ (US)

(73) Assignee: Grammarly, Inc., San Francisco, CA (US)

( * ) Notice: Subject to any disclaimer, the term of this patent is extended or adjusted under 35 U.S.C. 154(b) by 287 days.

(21) Appl. No.: 17/510,994

(22) Filed: Oct. 26, 2021

(65) Prior Publication Data

US 2023/0125194 A1    Apr. 27, 2023

(51) Int. Cl.
*G06F 40/166* (2020.01)
*G06F 3/0481* (2022.01)
(Continued)

(52) U.S. Cl.
CPC .......... *G06F 40/166* (2020.01); *G06F 3/0481* (2013.01); *G06F 40/103* (2020.01);
(Continued)

(58) Field of Classification Search
CPC .... G06F 40/166; G06F 3/0481; G06F 40/103; G06F 40/20; G10L 15/22; G10L 15/26; G10L 2015/223
See application file for complete search history.

(56) References Cited

U.S. PATENT DOCUMENTS 8,224,654 B1 *   7/2012   LeBeau ................... G10L 15/22
                                                                  704/235
8,320,531 B2 *   11/2012  Visser ..................... H04L 12/66
                                                                  379/88.16
(Continued)

OTHER PUBLICATIONS

Kudashkina, Katya, Patrick M. Pilarski, and Richard S. Sutton. "Document-editing assistants and model-based reinforcement learning as a path to conversational AI." arXiv preprint arXiv:2008.12095 (2020). (Year: 2020).*

(Continued)

*Primary Examiner* — Brian L Albertalli
(74) *Attorney, Agent, or Firm* — Baker Botts L.L.P.

(57) ABSTRACT

A computer-implemented process is programmed to process a source input, determine text enhancements, and present the text enhancements to apply to the sentences dictated from the source input. A text processor may use machine-learning models to process an audio input to generate sentences in a presentable format. An audio input can be processed by an automatic speech recognition model to generate electronic text. The electronic text may be used to generate sentence structures using a normalization model. A comprehension model may be used to identify instructions associated with the sentence structures and generate sentences based on the instructions and the sentence structures. An enhancement model may be used to identify enhancements to apply to the sentences. The enhancements may be presented alongside sentences generated by the comprehension model to provide the user an option to select either the enhancements or the sentences.

23 Claims, 8 Drawing Sheets

(51) Int. Cl.
*G06F 40/103* (2020.01)
*G06F 40/20* (2020.01)
*G06F 40/30* (2020.01)
*G10L 15/22* (2006.01)
*G10L 15/26* (2006.01)

(52) U.S. Cl.
CPC .............. *G06F 40/20* (2020.01); *G10L 15/22* (2013.01); *G10L 15/26* (2013.01); *G06F 40/30* (2020.01); *G10L 2015/223* (2013.01)

(56) References Cited

U.S. PATENT DOCUMENTS

| | | | | |
|---|---|---|---|---|
| 9,772,816 | B1* | 9/2017 | Bigham | G06F 3/167 |
| 11,361,151 | B1 | 6/2022 | Guberman et al. | |
| 11,676,607 | B2* | 6/2023 | Michaely | G06F 40/35 |
| | | | | 704/9 |
| 2012/0290299 | A1* | 11/2012 | Basson | G10L 15/26 |
| | | | | 704/235 |
| 2013/0275164 | A1* | 10/2013 | Gruber | G10L 17/22 |
| | | | | 705/5 |
| 2015/0235641 | A1 | 8/2015 | VanBlon et al. | |
| 2015/0279360 | A1 | 10/2015 | Mengibar et al. | |
| 2016/0027440 | A1* | 1/2016 | Gelfenbeyn | G10L 15/02 |
| | | | | 704/244 |
| 2016/0103875 | A1* | 4/2016 | Zupancic | G06F 40/20 |
| | | | | 707/773 |
| 2016/0196257 | A1* | 7/2016 | Choi | G06F 40/253 |
| | | | | 704/257 |
| 2016/0306783 | A1 | 10/2016 | Wu et al. | |
| 2019/0043504 | A1* | 2/2019 | Li | G10L 15/183 |
| 2020/0066262 | A1 | 2/2020 | Shu et al. | |
| 2020/0394258 | A1* | 12/2020 | Chen | G06F 40/284 |
| 2021/0118428 | A1 | 4/2021 | Hager | |
| 2021/0375289 | A1* | 12/2021 | Zhu | G06F 40/253 |
| 2022/0366910 | A1* | 11/2022 | Carbune | G10L 15/22 |
| 2023/0123574 | A1 | 4/2023 | Guberman et al. | |
| 2023/0153546 | A1* | 5/2023 | Peleg | G06F 40/166 |
| | | | | 704/9 |
| 2023/0290344 | A1* | 9/2023 | Cavallari | G06F 40/284 |
| | | | | 704/9 |

OTHER PUBLICATIONS

Sarrafzadeh, Bahareh, et al. "Characterizing stage-aware writing assistance for collaborative document authoring." Proceedings of the ACM on Human-Computer Interaction 4.CSCW3 (2021): 1-29. (Year: 2021).*

Wu, Yonghui. "Smart compose: Using neural networks to help write emails." Google AI Blog (2018). (Year: 2018).*

International Searching Authority, International Search Report and Written Opinion for International Application No. PCT/US 22/47591, dated Feb. 1, 2023, 13 pages.

* cited by examiner

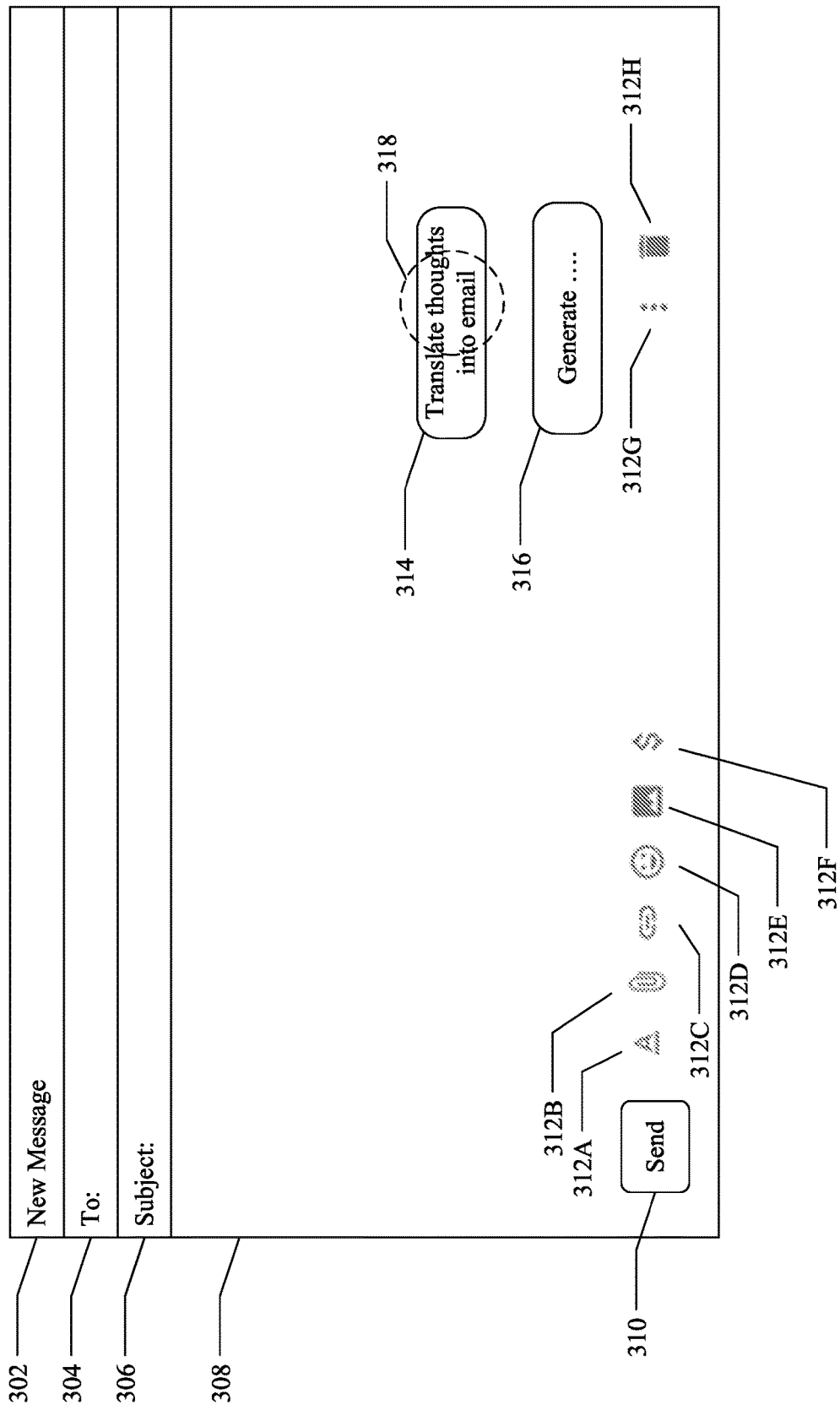

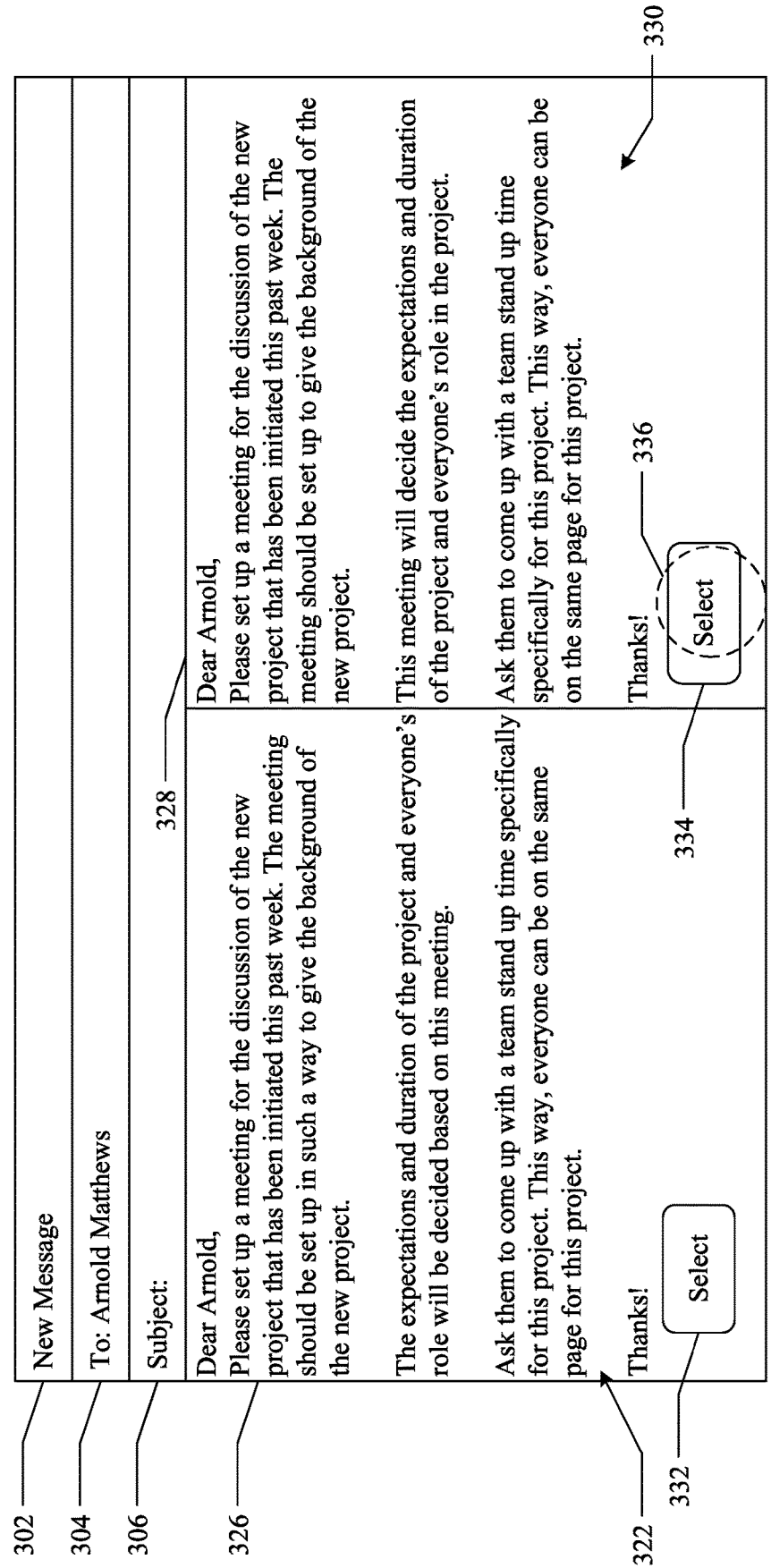

VOICE INSTRUCTED MACHINE AUTHORING OF ELECTRONIC DOCUMENTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2021 Grammarly, Inc.

TECHNICAL FIELD

One technical field of the present disclosure is computer-implemented methods of natural language processing of electronic documents. Other relevant technical fields are computer-implemented speech recognition, speech-to-text conversion, and grammatical error correction.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computers are widely used to compose, edit, and check electronic documents, including electronic mail (email), word processing documents, and text in web-based applications. Some writers struggle to compose electronic documents using correct grammar and sentence structure in a particular language, or face difficulty in choosing the best words to express the message that they intend to convey. The writer may be able to orally express the intent of a communication but may face difficulty in composing specific language.

Computer support is now available to dictate an input into a text processor. In most present approaches, to compose an electronic document, the user recites the specific text for the document into the text processor; computer-implemented speech-to-text methods transform digital data representing spoken speech into digital data representing text. However, many users are not capable of reciting the text they wish to include into a text processor verbatim. Typically, users may include filler words and other unintended inputs. The user may need a substantial amount of time after dictation for edits.

Text completion tools include GOOGLE Smart Compose and text autocomplete. Transcription services include NUANCE, SRIBIE, and TEMI. General voice assistants include GOOGLE ASSISTANT, SIRI, ECHO (ALEXA). Templatized tasks are implemented by COPY.AI, CONVERSION.AI, COPYSMITH, HEADLIME.

Based on the foregoing, a computer-implemented, high-speed online system with real-time response capability to receive spoken speech expressing the intent of a communication, but not the specific language, and to transform the speech into a draft electronic document that matches the intent, would have a high degree of utility.

SUMMARY

The appended claims may serve as a summary of the invention.

BRIEF DESCRIPTION OF THE DRAWINGS

In the drawings:

FIG. 3A, FIG. 3B, FIG. 3C, FIG. 3D, FIG. 3E each illustrates an example of a portion of a graphical user interface that may be programmed to display dictated text and enhancements in conjunction with an application.

DETAILED DESCRIPTION

Figure 1:
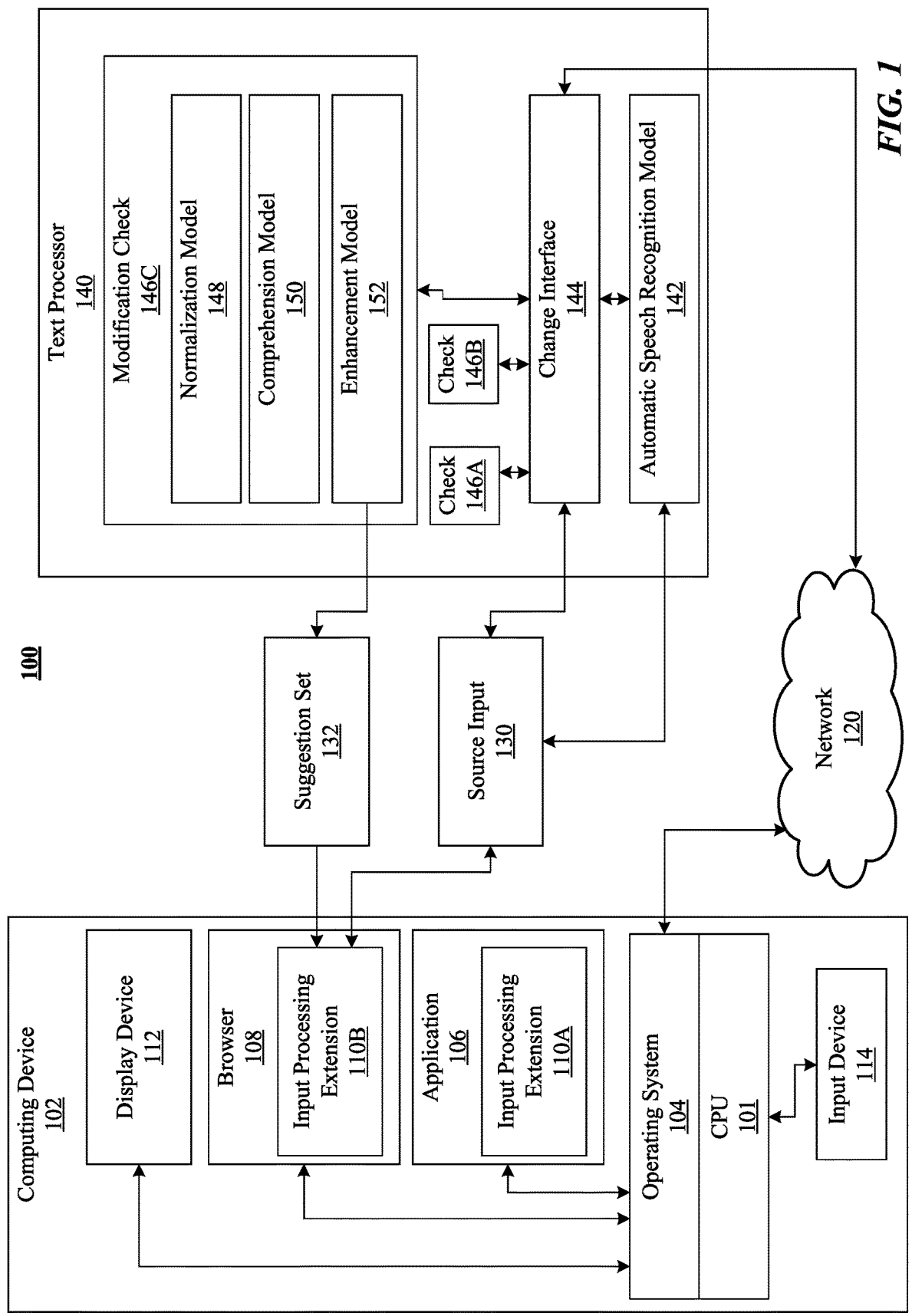
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:

1. General Overview
2. Structural & Functional Overview
   2.1 Computer System Context
   2.2 Input Processing Extensions of Client Device
   2.3 Speech Processing Using Extensions
   2.4 Text Processor
   2.5 Example Processing Workflow
3. Implementation Example—Hardware Overview
4. Benefits and Improvements

1. General Overview

In an embodiment, a computer-implemented process is programmed to process a source input, determine text enhancements, and present the text enhancements to apply to the sentences dictated from the source input. A text processor may use machine-learning models to process an audio input to generate sentences in a presentable format. An audio input can be processed by an automatic speech recognition model to generate electronic text. The electronic text may be used to generate sentence structures using a normalization model. A comprehension model may be used to identify instructions associated with the sentence structures and generate sentences based on the instructions and the sentence structures. An enhancement model may be used to identify enhancements to apply to the sentences. The enhancements may be presented alongside a sentences generated by the comprehension model to provide the user an option to select either the enhancements or the sentences. The comprehension model and the enhancement model may be the same model. In this manner, a spoken input can be transformed automatically into a complete draft of an electronic text, document, or email that expresses the intent of the speech input in standard or less informal language than the speech input.

An implementation optionally may be programmed to generate a text in a paraphrased form. The paraphrased form may use slightly different phrasing than for the text that is originally generated. Or, multiple versions of the text can be produced with different levels of formality or specificity. Paraphrasing may involve different words, phrases or entire sentences.

2. Structural & Functional Overview

FIG. 1 illustrates a distributed computer system showing the context of use and principal functional elements with which one embodiment could be implemented.

2.1 Computer System Context

In FIG. 1, in one embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In the example of FIG. 1, a computing device 102 is communicatively coupled via a network 120 to a text processor 140. In one embodiment, computing device 102 comprises a client-type computing device such as a personal computer, laptop computer, tablet computer, smartphone, or notebook computer. For purposes of illustrating a clear example, a single computing device 102, network 120, and text processor 140 are shown in FIG. 1, but practical embodiments may include thousands to millions of computing devices 102 distributed over a wide geographic area or over the globe, and hundreds to thousands of instances of text processors 140 to serve requests and computing requirements of the computing devices. Although shown as a text processor 140, a general input processor may be used to process different modalities of inputs, such as an audio input or a visual input.

Computing device 102 comprises, in one embodiment, a central processing unit (CPU) 101 coupled via a bus to a display device 112 and an input device 114. Input device 114 broadly represents a keyboard, mouse, trackball, microphone, or other means to initially signal or create digital data in the computing device 102. In some embodiments display device 112 and input device 114 are integrated, for example, using a touch-sensitive screen to implement a soft keyboard. CPU 101 hosts operating system 104, which may include a kernel, primitive services, a networking stack, and similar foundation elements implemented in software, firmware, or a combination. Operating system 104 supervises and manages one or more other programs. For purposes of illustrating a clear example, FIG. 1 shows the operating system 104 coupled to an application 106 and a browser 108, but other embodiments may have more or fewer apps or applications hosted on computing device 102.

Network 120 broadly represents one or more local area networks, wide area networks, campus networks, or internetworks in any combination, using any of terrestrial or satellite, wired or wireless network links.

2.2 Input Processing Extensions of Client Device

At runtime, one or more of application 106 and browser 108 load, or are installed with, an input processing extension 110A, 110B, which comprises executable instructions that are compatible with text processor 140 and may implement application-specific communication protocols to rapidly communicate text-related commands and data between the extension and the text processor. Input processing extensions 110A, 110B may be implemented as runtime libraries, browser plug-ins, browser extensions, or other means of adding external functionality to otherwise unrelated, third-party applications or software. The precise means of implementing an input processing extension 110A, 110B is not critical provided that an extension is compatible with and can be functionally integrated with a host application 106 or browser 108.

In some embodiments, each input processing extension 110A, 110B is linked, loaded with, or otherwise programmatically coupled to or with one or more of application 106 and browser 108 and, in this configuration, is capable of calling API calls, internal methods or functions, or other programmatic facilities of the application or browser. These calls or other invocations of methods or functions enable each input processing extension 110A, 110B to detect text or an audio input that is entered in input fields, windows, or panels of application 106 or browser 108, instruct the application or browser to delete a character, word, sentence, or other unit of text, and instruct the application or browser to insert a character, word, sentence, or other unit of text.

Each of the input processing extensions 110A, 110B is programmed to interoperate with a host application 106 or browser 108 to detect the entry of text in a text entry function of the application or browser and/or changes in entered text, to transmit changes in text to text processor 140 for server-side checking and processing, to receive responsive data and commands from the text processor, and to execute presentation functions in cooperation with the host application or browser. In one embodiment, the input processing extension 110B associated with the browser may receive a source input 130 that a user inputs into a text box or other GUI widget that the browser 108 has rendered in response to receiving a dynamically generated webpage from a web server or web application. In response, the input processing extension 110B is programmed to transmit the source input 130 to change interface 144 of text processor 140. The change interface 144 acts as a multiplexer to programmatically provide the source input 130 to each of a plurality of checks 146A, 146B, 146C. The checks 146A, 146B, 146C execute functionally different checks on the source input and output one or more suggestions for changes, instructions to highlight or emphasize text, or other output as suggestion set 132. The checks 146A, 146B, 146C use an HTTP POST call, application-specific protocol call, or other programmatic means to return the suggestion set 132 to the input processing extension 110B, which renders or causes rendering the suggestions in GUI elements that the browser 108 controls.

As one functional example, assume that browser 108 renders an HTML document that includes a text entry panel in which a user can enter free-form text describing a product or service. The text entry panel may include an audio input widget, where a user can initiate a dictation process for the computing device 102 to receive an audio input. The input processing extension 110B is programmed to detect user selection of the text entry panel, the entry of text or changes in text within the panel, and to transmit all such text changes to text processor 140. The input processing extension 110B is programmed to detect reception of an audio input after initiation of a dictation process and to transmit the audio input to the text processor 140. In an embodiment, each input processing extension 110A, 110B is programmed to buffer or accumulate text changes locally over a programmable period, for example five seconds, and to transmit the accumulated changes over that period as a batch to text processor 140. Buffering or accumulation in this manner, while not required, may improve performance by reducing network messaging roundtrips and reducing the likelihood that text changes could be lost due to packet drops in the networking infrastructure. A commercial example of input processing extensions 110A, 110B is the GRAMMARLY extension, commercially available from Grammarly, Inc. of Kyiv, Ukraine.

For convenience, certain sections of this disclosure refer to computer-implemented operations with a "user." The term "user" can refer to a computer, account, or session, any of which can be associated with an individual user. The disclosure is intended to encompass only interoperation among machines or machine-implemented processing elements and not to cover or require the use of manual or human actions.

2.3 Speech Processing Using Extensions

In an embodiment, each of the input processing extensions 110A, 110B is programmed to execute a speech input process to receive digital data representing spoken speech from input device 114, such as through a microphone, preamplifier, analog-to-digital converter, microphone services, or other audio services of operating system 104 of the computing device 102. The computing device 102 and operating system 104 will typically provide, as basic operating system services and hardware interfaces, the hardware and software necessary to couple to a built-in or external microphone, receive spoken speech, form digital speech data from the speech, and programmatically provide the digital speech data to other programs, and the specific means of implementing these elements and functions are outside the scope of this disclosure but within the scope of knowledge of a person having ordinary skill in the technical fields applicable to this disclosure.

In an embodiment, each of the input processing extensions 110A, 110B is programmed to populate an input field, text box, other GUI widget, or other element of browser 108 or application 106 in real-time in response to receiving the digital speech data. In some embodiments, each of the input processing extensions 110A, 110B is programmed to natively execute speech-to-text conversion algorithms to form digital text from the digital speech data; in other embodiments, each of the input processing extensions 110A, 110B is programmed to call a speech-to-text conversion service of the operating system 104, another program hosted at computing device 102, another program hosted at text processor 140, or a networked service of a separate server computer via network 120. For example, AMAZON speech services can be called to transform digital speech into digital text. Or, the input processing extensions 110A, 110B maybe programmed to call an automatic speech recognition model 142 of text processor 140 via network 120 to execute speech-to-text conversion.

2.4 Text Processor

In an embodiment, the text processor 140 comprises one or more server computers, workstations, computing clusters, and/or virtual machine processor instances, with or without network attached storage or directly attached storage, located in any of an enterprise premises, private datacenter, public datacenter and/or cloud computing center. Text processor 140 broadly represents a programmed server computer having processing throughput and storage capacity sufficient to communicate concurrently with thousands to millions of computing devices 102 associated with different users or accounts. For purposes of illustrating a clear example and focusing on innovations that are relevant to the appended claims, FIG. 1 omits basic hardware elements of text processor 140 such as a CPU, bus, I/O devices, main memory, and the like, illustrating instead an example software architecture for functional elements that execute on the hardware elements. Text processor 140 also may include foundational software elements not shown in FIG. 1, such as an operating system consisting of a kernel and primitive services, system services, a networking stack, an HTTP server, other presentation software, and other application software. Thus, text processor 140 may execute at a first computer, and input processing extensions 110A, 110B may execute at a second computer.

Text processor 140 comprises a plurality of one or more sequences of stored program instructions to implement the functional elements shown in FIG. 1. In an embodiment, text processor 140 comprises one or more sequences of program instructions to implement an automatic speech recognition model 142. The automatic speech recognition model 142 is a trained machine learning model that is programmed to receive an audio input to process and convert the audio input to digitally stored electronic text. The audio input may comprise digitally stored data representing spoken speech.

The automatic speech recognition model 142 is programmed to send or provide the digitally stored electronic text to a change interface 144, for example by calling a function, method, or programmatic interface of the change interface 144. In an embodiment, text processor 140 comprises a change interface 144 that is coupled indirectly to network 120. Change interface 144 is programmed to receive the text changes that input processing extensions 110A, 110B transmit to text processor 140, and to distribute the text changes to a plurality of different checks 146A, 146B, 146C. Change interface 144 is programmed to receive digitally stored electronic text generated by the automatic speech recognition model 142 and combine the text with the text received from the input processing extensions 110A, 110B. To illustrate a clear example, source input 130 of FIG. 1 represents one or more text changes or one or more audio inputs that input processing extension 110B transmits to change interface 144 or automatic speech recognition model 142 to be converted to text. In an embodiment, change interface 144 is programmed to distribute each and every text change arriving from an input processing extension 110A, 110B to all of the checks 146A, 146B, 146C, which execute in parallel and/or in independent threads.

Thus, in one embodiment, the text processor 140 may be programmed to programmatically receive a digital electronic object comprising a source input, a message with the source input, an application protocol message with the source input, an HTTP POST request with the source input as a payload, or using other programmed mechanics. In various embodiments, the first computer executes a text processor that is communicatively coupled to a text processor extension that is executed at the second computer and programmatically receives the digital electronic object comprising the source input via a message initiated at the text processor extension and transmitted to the text processor; and/or the text processor extension executes in association with an application program that is executing at the second computer, the text processor extension being programmed to automatically detect a change in a text entry window of the application program or reception of an audio input within the application program and, in response, to initiate the message; and/or the text processor executes in association with browser that is executing at the second computer, the text processor extension being programmed to automatically detect a change in a text entry widget of the browser and, in response, to initiate the message.

Each of the checks 146A, 146B, 146C is programmed to execute a different form of checking or processing of a text change that has arrived. Example functions that checks 146A, 146B could implement include grammar checking, tone detection, and translation. In an embodiment, check 146C is programmed as a modification check and therefore it is also denoted "modification check 146C" in this description.

In an embodiment, modification check 146 comprises a normalization model 148, a comprehension model 150, and an enhancement model 152. The comprehension model and enhancement model can be the same model. Furthermore, the normalization model can be combined with the comprehension model and/or enhancement model. Thus, a single unified model can be used. In some embodiments, separation of models may have benefits to segregate functions such as sentence tokenization, restoration of punctuation, removal of disfluency, or others, to thereby enable the comprehension model to receive a cleaner input and perform better. In yet another embodiment, a single speech-to-text model could be trained to receive speech input and generate a communication such as an email as an output.

Modification check 146C and/or text processor 140 may be programmed for evaluating each particular source input among the plurality of source input units using the normalization model 148, comprehension model 150, and enhancement model 152 to generate one or more enhancements to an input. Models 148, 150, 152 may be implemented as a serial workflow in which outputs of the normalization model 148, comprehension model 150, and enhancement model 152 are provided as inputs to the next model in order of the workflow. As an example, and not by way of limitation, one or more sentences generated by the normalization model 148 may be sent to the comprehension model 150 to process. Each of the normalization model 148, comprehension model 150, and enhancement model 152 may comprise trained machine learning classifiers that receive a specified dataset as input and produce a classification output to perform the functions and tasks as described further herein in other sections. For example, models such as BERT and GPT-3, having been trained on large corpora of text, may be used.

Normalization model 148 may be implemented as a trained machine learning classifier that receives digital data representing raw text as an input, and outputs modified text that applies normalization options such as determining sentence boundaries or tokenization of text units consisting of sentences or other units. Comprehension model 150 may comprise a trained machine learning classifier that receives normalized text from normalization model 148 as input, and outputs data reflecting a comprehension of the intent of the speaker. Enhancement model 152 may comprise a trained machine learning classifier that receives the comprehension data as input, and outputs an enhanced text, based on the normalized text, as a draft for further inspection and modification by a user. In some embodiments, the enhanced text may be provided to instructions that implement a conventional grammatical error correction (GEC) translator to produce suggestions for improved grammar, word choice, or sentence structure in the enhanced text.

As one example of operation, an audio input is received at an input processing extension 110A, 110B, transformed to digital speech data as described above, and subjected to speech recognition to yield digital input text. Sentences or other language units in the digital input text may not be formatted in a formal, comprehensible, or otherwise presentable manner.

In an embodiment, an input processing extension 110A, 110B detects the digital input text, issues an HTTP GET or POST call or other programmatic call to text processor 140, thereby providing the digital input text as the source input 130 to the change interface 144. The change interface distributes the digital input text to the checks 146A, 146B, 146C. Modification check 146 detects the presentation of digital input text and, in response, is programmed to execute a workflow comprising normalization model 148, comprehension model 150, and enhancement model 152.

The digital input text is programmatically provided first to normalization model 148. In an embodiment, normalization model 148 is programmed to generate one or more digitally stored sentence structures based on the digital input text and to programmatically provide the sentence structures to the comprehension model 150.

In an embodiment, comprehension model 150 is programmed to identify one or more instructions that had been spoken in the audio input and that are now represented in the digital input text. For instance, the audio input may comprise text that was not dictated verbatim as the contents of a communication, but rather conversational content expressing the intent of a communication to be formed or comprising instructions to the system 100 about what communication is desired or intended. As an example, and not by way of limitation, the audio input may include a request to generate an email to a coworker having a specified intent or a specified approximate content or desired content. The comprehension model 150 is programmed to identify instructions or expressions of intent in the digitally stored sentence structures and to transform the digitally stored sentence structures into altered sentence structures. Generating improved sentence structures may comprise adding tokens, words, or other structures, deleting them, or substituting different ones. The altered sentence structures more closely comprise the intended communication and are free of instructions or expression of intent. Comprehension model 150 is programmed to programmatically provide the altered sentence structures to enhancement model 152.

In various embodiments, enhancement model 152 may be programmed to receive either the altered sentence structures from the comprehension model 150 or the original sentence structures from the normalization model 148. The enhancement model 152 may process the sentence structures to determine one or more enhancements to further modify the sentence structures, refining the sentence structures to closely resemble an accurate draft of the desired or intended communication.

2.5 Example Processing Workflow

Figure 2:
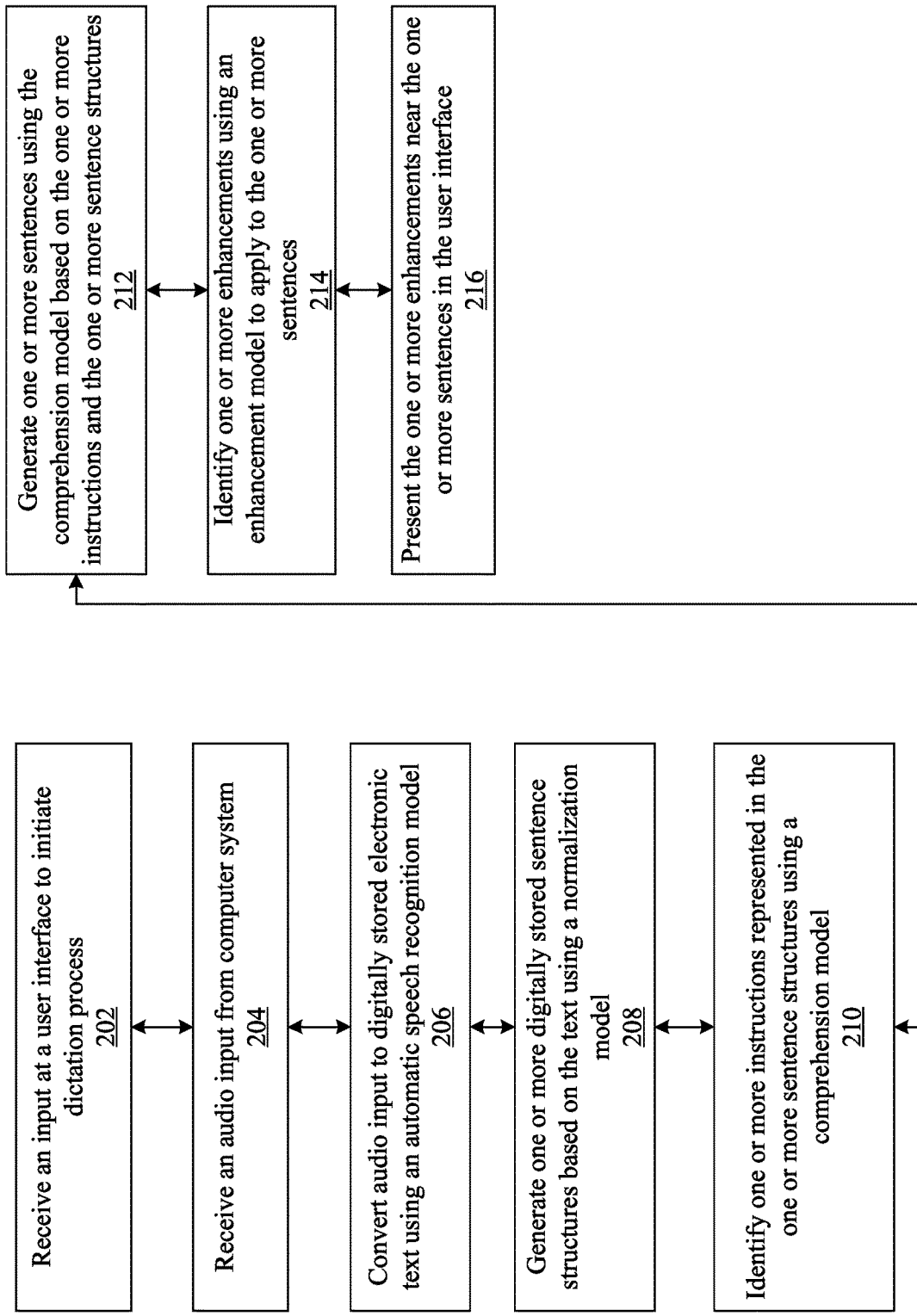
FIG. 2 illustrates a computer-implemented process of processing a source input, determining text enhancements, and presenting the text enhancements, in one embodiment.

FIG. 2 illustrates a computer-implemented process of processing a source input, determining text enhancements, and presenting the text enhancements, in one embodiment. FIG. 2 and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

In an embodiment, the functional elements of check 146C of FIG. 1 comprise programmed instructions to implement the process flow 200 of FIG. 2. Referring first to step 202 of FIG. 2, in an embodiment, using an input processing extension coupled to an application program or an input processing extension coupled to a browser, the process 200 receives an input at a user interface to initiate a dictation process. As an example, and not by way of limitation, as described in FIG. 1, each input processing extension 110A, 110B is programmed to detect user selection of an audio input widget. The user selection of the audio input widget may initiate a dictation process where the computer system (or computing device of FIG. 1) may wait to receive an audio input. Thus, invocation of the process 200 shown in FIG. 2 occurs in response to a user selecting an audio input widget in application 106 (FIG. 1) or browser 108. The user may reselect the audio input widget to reinitiate the dictation process, which would visually erase the previously generated one or more sentences and the one or more enhancements.

At step 204, the input processing extension may receive an audio input from the computer system. Although an audio input is discussed, the computer system may receive text inputs in addition to the audio input. The audio input may comprise digitally stored data representing spoken speech.

At step 206, the audio input may be sent to a text processor of a computer system which may convert the audio input to a digitally stored electronic text using an automatic speech recognition model. The text processor may communicate with one or more third-party services to use an automatic speech recognition model.

At step 208, the text processor may generate one or more digitally stored sentence structures based on the digitally stored electronic text using a normalization model. The normalization model may be a machine-learning model that changes text into quasi-sentences. For instance, the normalization model may add punctuation, capitalization, and the like to the digitally stored electronic text.

At step 210, the text processor may identify one or more instructions represented in the one or more sentence structure using a comprehension model. These instructions may include one or more of a command to generate one or more sentences, a command to access an email thread, a command to generate a response to an email thread, or other types of instructions.

The comprehension model may then generate one or more sentences based on the one or more instructions and the one or more sentence structures at step 212. The comprehension model may perform one or more of rearranging one or more sentence structures, removing one or more words from the sentence structures, or adding one or more additional words to the sentence structures when generating the one or more sentences.

At step 214, the text processor may identify one or more enhancements using an enhancement model to apply to the one or more sentences. The one or more enhancements may include one or more of inserting one or more transition words into the one or more sentences, deleting one or more transition words from the one or more sentences, merging two sentences of the one or more sentences, splitting one sentence of the one or more sentences into two separate sentences, and the like. After the one or more enhancements are identified, the computer system may receive instructions to present the one or more enhancements near the one or more sentences in the user interface.

As an example, and not by way of limitation, the computer system may present the one or more enhancements in juxtaposition with the one or more sentences in the user interface. The text processor may be processing the audio input received and update the one or more enhancements and one or more sentences in a user interface in real-time. If the user decides to select the one or more enhancements, the computer system may populate a graphical user interface with the selection. In a scenario a user is dictating an email message, the computer system may access an email thread directed between the user and another user based on instructions identified by the comprehension model and send a selection as a response within the email thread. The enhancements to apply to one or more sentences may be based on a context of the sentences. For example, for a message thread between a first user and a second user, the voice of the first user may include certain characteristics, such as an informal voice. The enhancements identified to apply to the one or more sentences may include the informal voice to match how the user would typically communicate with the second user. The enhancements identified to apply to one or more sentences may be different if the user is communicating with a third user instead of the second user.

An implementation optionally may be programmed to generate a text in a paraphrased form. The paraphrased form may use slightly different phrasing than for the text that is originally generated. Or, multiple versions of the text can be produced with different levels of formality or specificity. Paraphrasing may involve different words, phrases or entire sentences. In one embodiment, paraphrasing can be incorporated into a final generated model. Paraphrasing models can be based on the same architecture as otherwise described herein but are programmed to receive a sentence as input and to generate a paraphrased version of the same sentence.

In an embodiment, the PAWS, Parabank, Parabankv2 and ToneAI datasets can be used in a training stage of a paraphrasing model. PAWS can mean Paraphrase Adversaries from Word Scrambling and is described, at the time of this writing, in documents in the folder "google-research-datasets/paws" on GITHUB. PAWS contains about 100,000 human-labeled and 650,000 noisily labeled pairs that feature the importance of modeling structure, context, and word order information for the problem of paraphrase identification. Parabank can refer to the data that is described at the time of this writing in the folder "/parabank/" of the domain "nlp.jhu" in the EDU domain on the internet. ToneAI can refer to a dataset having the following characteristics: about one million records consisting of fully de-identified email documents, randomly or pseudo-randomly sampled across email domains over a one-week period; sourced from session end feedback logs; example email domains can include mail.google.com, mail.yahoo.com, and outlook.* domains; records are not clustered; document length between 20 to 10,000 characters. With these datasets, an embodiment can train three different sentence-level paraphrasing models using the data in the following combinations: (Model G1) Parabank+ToneAI, (Model G2) Parabankv2 (full) and (Model G3) Parabankv2 (filtered).

Then, a paraphrase recognizer (denoted D1) can be trained based on PAWS; given a pair of sentences, it can predict whether they are paraphrases. Next, each of Models G1, G2, G3 is trained on sentence-level data. They cannot paraphrase paragraphs or documents out of the box (or with high quality). Instead, Models G1, G2, and G3 can be used to create paraphrases of emails by running the emails through these models, sentence-by-sentence, and then using D1 to rank the quality of the paraphrases. The same emails that were used to train the comprehension model can be used. In this way, an existing corpus of instruction-email pairs can be transformed to instruction-paraphrased_email pairs. The previously described comprehension model can be trained on this new dataset and is used as a new or updated comprehension model.

Figure 3B:
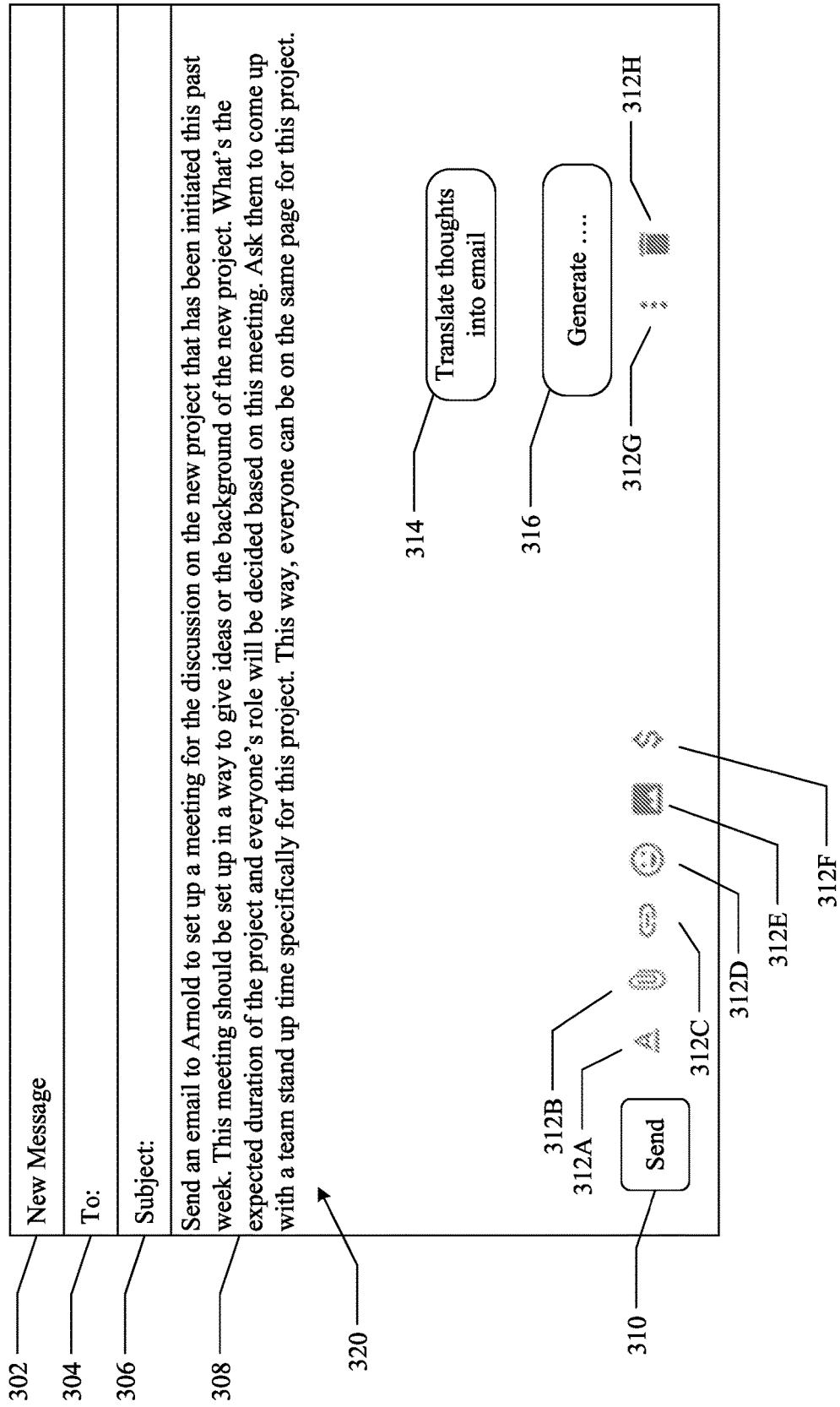

FIG. 3A, FIG. 3B, FIG. 3C, FIG. 3D, FIG. 3E each illustrates an example of a portion of a graphical user interface that may be programmed to display dictated text and enhancements in conjunction with an application. Referring first to FIG. 3A, in an embodiment, the application 106 (FIG. 1) may comprise an email client program that generates and causes displaying a graphical user interface 300. Or, the GUI 300 of FIG. 3A may form part of a webpage that a web application generates and returns to browser 108. In an embodiment, GUI 300 may comprise a message window 302, a receiver field 304, subject field 306, a body field 308, a send button 310, a plurality of selectable graphical buttons 312A, 312B, 312C, 312D, 312E, 312F, 312G, 312H, a dictation button 314, and an enhancement button 316.

In an embodiment, receiver field 304 is a GUI widget that is programmed to receive an email address of a recipient of a message and may be programmed with pattern matching logic to test whether input to the field is a valid email address. In an embodiment, subject field 306 is a GUI widget that is programmed to receive a subject of the message in the form of one or more characters. In an embodiment, the body field 308 is a GUI widget that is programmed to receive text input specifying the substantive body of a message. The send button 310 may be a GUI widget that is programmed to be selected, in the manner of a hyperlink or event link, and in response, to programmatically call a mail transfer agent (MTA) or other mail transmission program to cause sending the message.

In an embodiment, each of the buttons 312A, 312B, 312C, 312D, 312E, 312F, 312G, 312H comprises a GUI widget that is programmed to execute functions to modify the message or text within the message. For example, button 312A comprises a GUI widget that is programmed to open a typeface attribute panel with controls for modifying typeface attributes of text in the body field 308 to apply underlining, boldface, strikeout, other typefaces, and similar changes in attribute. In an embodiment, button 312B is programmed to execute opening and displaying a file attachment dialog, which may include a file browse dialog to select a file to be attached to and sent with the message. In an embodiment, button 312C is programmed to execute functions to modify the attributes of specified text to insert a hyperlink to a networked page or a MAILTO: link identifying an email address. In an embodiment, button 312D is programmed to execute functions to insert one or more emojis or other symbolic content in the message body 308. In an embodiment, button 312E is programmed to execute functions to select and insert a graphical image within the message body 308. In an embodiment, button 312F is programmed to execute functions to insert one or more special symbols in the message body 308. In an embodiment, button 312G is programmed to display other control options or functions than previously specified. In an embodiment, button 312H is programmed to discard or delete the message window 302 and its contents.

In an embodiment, the dictation button 314 comprises a GUI widget that is selectable using a pointing device or keyboard. Circle 318 represents the focus of a cursor, pointing device or keyboard command to select the dictation button 314 which is programmed, in response to selection or clicking, to initiate recording speech that the user speaks into an input device 114 (FIG. 1) such as a microphone. In an embodiment, the enhancement button 316 is programmed to execute functions to stop recording and generate text that may be displayed in message body 308. Typically, the dictation button 314 is selected first to orally speak an intended communication, then the enhancement button 316 is selected to end the recording and start text generation, then the process of FIG. 2 or the structural elements of FIG. 1 execute to generate draft text in the message body 308 and also offer suggestions. In some embodiments, selecting the dictation button 314 also causes generating a notification message in the GUI to announce that recording is occurring.

In FIG. 3B, message body 308 comprises an example result of selecting the dictation button 314, receiving an audio input comprising spoken speech expressing an intent or desired content of a message, executing speech-to-text conversion, and outputting the speech as visible text 320. In some embodiments, speech to a microphone may directly dictate the visible text 320 into the body 308 of the message 302 to present to the user. The use of a display like FIG. 3B is optional and some embodiments may be programmed to display FIG. 3A, receive spoken speech, execute speech-to-text conversion and modification of the text via the normalization model and comprehension model, and transition to FIG. 3C without showing a dictation display like FIG. 3B.

Figure 3C:
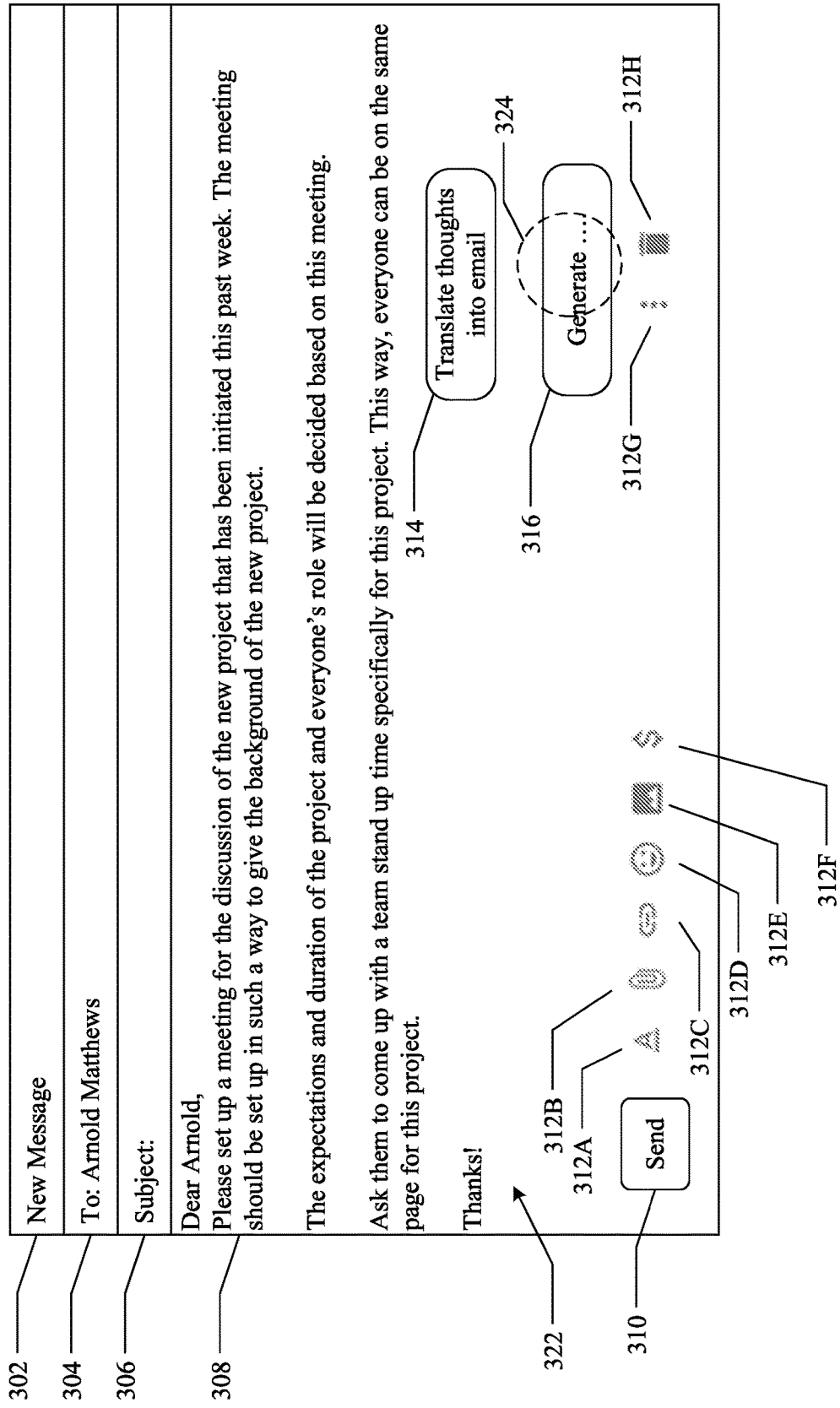

FIG. 3C illustrates the same message as in FIG. 3A, FIG. 3B, after processing the user input using the normalization model and the comprehension model to output updated text 322 in the message body 308. The normalization model may process the user input to generate sentence structures and the comprehension model may identify instructions from the sentence structures and generate sentences based on the instructions and sentence structures. For example, the visible text 320 after dictation included the instruction "send an email to Arnold." The comprehension model may evaluate that instruction and, using classification or other machine modeling techniques, output draft text representing an email message to Arnold.

In some embodiments, the system or process of FIG. 1, FIG. 2 may be programmed to access a contact list and identify contacts associated with the name Arnold. Based on previous email messages, other documents, or other sources, the system or process of FIG. 1, FIG. 2 may be programmed to identify that Arnold Matthews is the intended recipient of the message. The system or process of FIG. 1, FIG. 2 may be programmed to populate the receiver field 304 with Arnold Matthews.

Another user selection 324 may be received to select the enhancement button 316, which may be programmed to invoke the text processor (FIG. 1) to identify one or more enhancements to apply to the output 322. FIG. 3D illustrates an example result of selecting the enhancement button 316. In an embodiment, text processor 140 (FIG. 1) may be programmed to use the enhancement model 152 to process the updated text 322 to generate enhanced text 330 including one or more enhancements to the output 322. The user interface 300 may comprise fields 326, 328 that are programmed as GUI widgets to contain the outputs 322, 330, respectively. Each field 326, 328 may comprise a select button 332, 334 in the form of a GUI widget that is programmed to receive a selection to include in the original body 308 of the message 302. A user selection 336 may be received to select the button 334 corresponding to the enhanced text 330 to signal that the enhanced text is to be used.

Figure 3E:
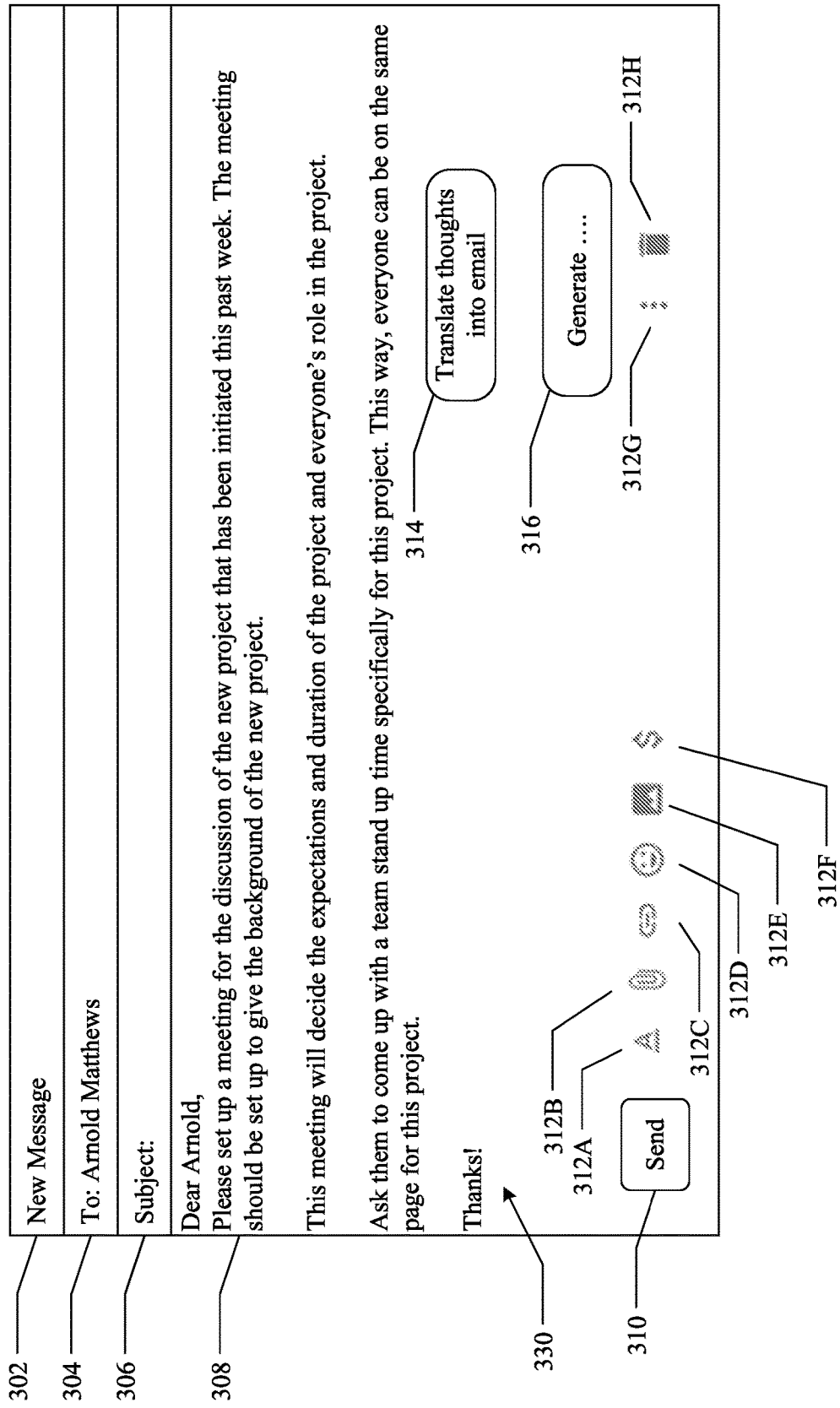

FIG. 3E illustrates an example result of selecting the button 334. In an embodiment, the system or process of FIG. 1, FIG. 2 may be programmed to populate the body 308 with the output 330 for the user to review. After the user is satisfied with the message, the user may proceed to send the message using the send button 310.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
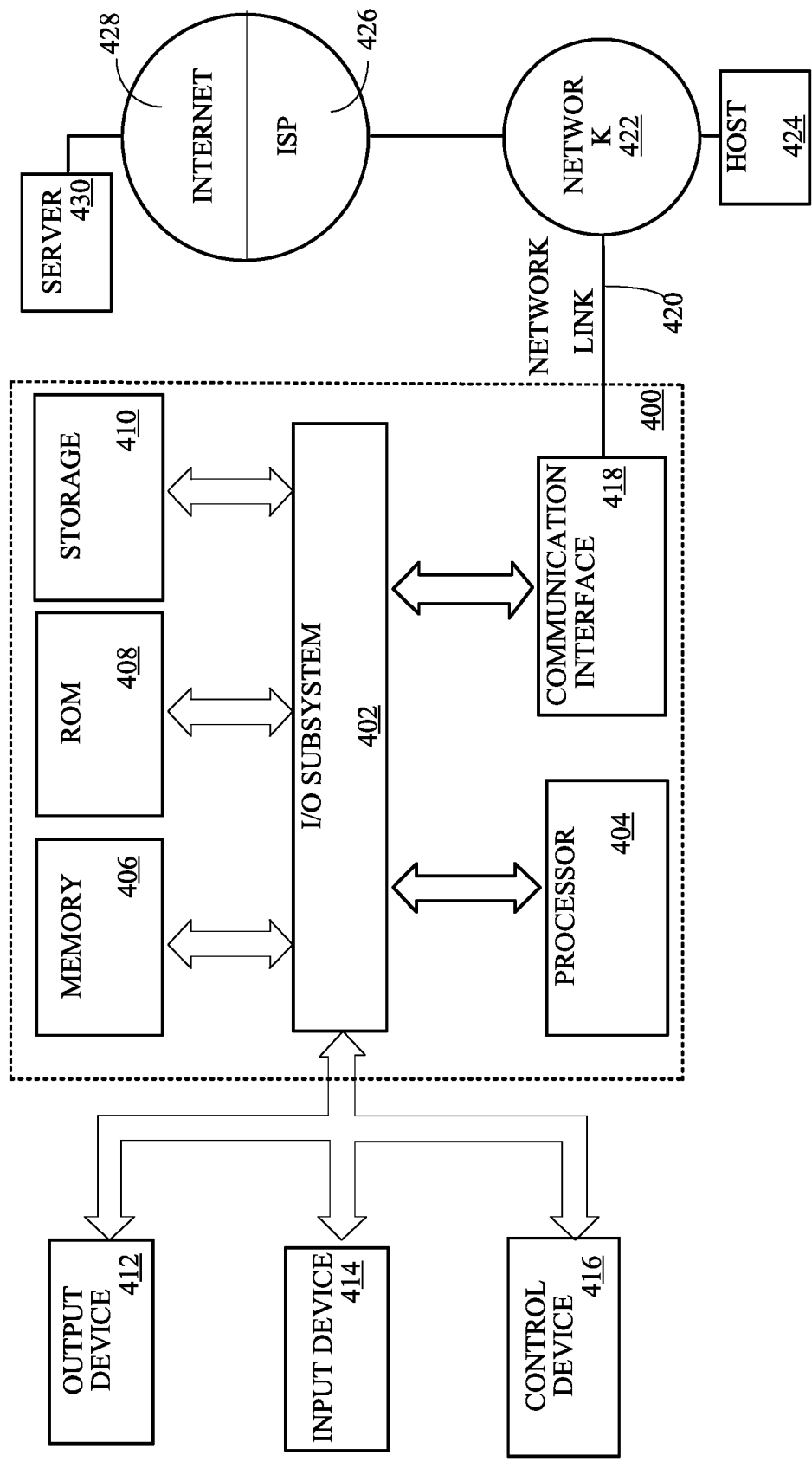
FIG. 4 illustrates a computer system with which one embodiment could be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk, or optical disk such as CD-ROM or DVD-ROM and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators, or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork, or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic, or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine, or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

4. Benefits and Improvements

Embodiments provide effective, efficient, new, machine-implemented methods to assist writers at the point at which they first gather their thoughts, when using computer-implemented composition tools such as word processing applications, email applications, browsers with data entry fields, or any other computer-executed application that supports the creation of text or other writing. A writer may have general ideas about what they want to say but converting those ideas to an organized first draft can be challenging for many. Past software and machine-implemented methods have focused on assisting users after they translate general ideas into writing, either as draft text or final text. In contrast, the methods of this disclosure can generate text for the human user instead, based on flexible, incomplete inputs that the human user has provided to a program application. Embodiments can use large language models to convert instructions, converted to electronic text from spoken audio or speech, to coherent text. The approaches of this disclosure thus allow users to speak naturally into a microphone, and later view or use digital electronic written text that represents an improvement or enhancement to the text derived from the original speech.

Embodiments may be programmed as a virtual assistant that is capable of understanding users' natural and unstructured thoughts and producing finished writing. At the outset of forming an electronic document or communication, often it is simplest for users to say what is on their minds. Writing tools like keyboards and text editors can be clumsy intermediaries that impede the ability to stay in flow. Further, the recursive process of typing, reading, deleting, and rewriting may divert attention from the meaning to be conveyed, causing the user to lose context and forget what they wanted to say. In contrast, embodiments allow users to express themselves creatively without the standard impediments of the early writing process.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising, executed by one or more of a computer system and a text processor that is coupled to the one or more computer system via a network:
   receiving, at a user interface of the one or more computer systems, a first input to initiate a dictation process;
   receiving, in response to an initiation of the dictation process, an audio input from the one or more computer systems;
   converting, using an automatic speech recognition model, the audio input to digitally stored electronic text;
   generating, using a normalization model, one or more digitally stored sentence structures based on the digitally stored electronic text;
   identifying, using a comprehension model, one or more instructions represented in the one or more digitally stored sentence structures;
   generating, using the comprehension model, one or more sentences based on the one or more instructions and the one or more sentence structures;
   identifying, using an enhancement model to analyze the one or more sentences, one or more enhancements to apply to the one or more sentences that alters the one or more sentences; and
   presenting, at a display of the one or more computer systems, the one or more enhancements near the one or more sentences in the user interface of the one or more computer systems, each particular enhancement of the one or more enhancements being selectable via a second input from the one or more computer systems to apply the particular enhancement to the one or more sentences.

2. The method of claim 1, further comprising formatting and transmitting to the one or more computer systems presentation instructions that are programmed to cause displaying the user interface with a selectable graphical widget to initiate the dictation process and receiving the first input by receiving a selection of the selectable graphical widget.

3. The method of claim 1, further comprising: formatting and transmitting to the one or more computer systems presentation instructions that are programmed to cause the display of the user interface with a selectable graphical widget to reinitiate the dictation process; receiving a second input from the one or more computer systems specifying selection of the graphical widget; and, in response to the second input, visually erasing the previously generated one or more sentences and the one or more enhancements.

4. The method of claim 1, further comprising updating the one or more enhancements and the one or more sentences in the user interface in real-time as the audio input is received from the one or more computer systems.

5. The method of claim 1, further comprising identifying, in the one or more sentence structures using the comprehension model, one or more of a command to generate the one or more sentences, a command to access an email thread, or a command to generate a response to the email thread.

6. The method of claim 1, further comprising generating the one or more sentences by one or more of rearranging the one or more sentence structures, removing one or more words from the sentence structures, or adding one or more additional words to the sentence structures.

7. The method of claim 1, further comprising identifying, using the enhancement model to analyze the one or more sentences, one or more of inserting one or more transition words into the one or more sentences, deleting one or more transition words from the one or more sentences, merging two sentences of the one or more sentences, splitting one sentence of the one or more sentences into two separate sentences.

8. The method of claim 1, further comprising:
   receiving from the one or more computer systems a third input specifying a selection of the one or more sentences or one of the one or more enhancements;
   accessing an email thread comprising a plurality of email messages directed between the first user and a second user; and
   sending the selection as a response within the email thread.

9. The method of claim 8, further comprising identifying, using the enhancement model to analyze the one or more sentences, the one or more enhancements to apply to the one or more sentences based on the email thread between the first user and the second user.

10. One or more computer-readable non-transitory storage media embodying software that is operable when executed to:
   receive, at a user interface of a computer system, a first input to initiate a dictation process;
   receive, in response to the initiation of the dictation process, an audio input from the computer system;
   convert, using an automatic speech recognition model, the audio input to digitally stored electronic text;
   generate, using a normalization model, one or more digitally stored sentence structures based on the text;

identify, using a comprehension model, one or more instructions represented in the one or more digitally stored sentence structures;

generate, using the comprehension model, one or more sentences based on the one or more instructions and the one or more digitally stored sentence structures;

identify, using an enhancement model to analyze the one or more sentences, one or more enhancements to apply to the one or more sentences that alters the one or more sentences; and present, at a display of the computer system, the one or more enhancements near the one or more sentences in the user interface of the computer system, each particular enhancement of the one or more enhancements being selectable via a second input from the computer system to apply the particular enhancement to the one or more sentences.

11. The media of claim 10, wherein the software is further operable when executed to format and transmit to the computer system presentation instructions that are programmed to cause displaying the user interface with a selectable graphical widget to initiate the dictation process, and receive the first input by receiving a selection of the selectable graphical widget.

12. The media of claim 10, wherein the software is further operable when executed to format and transmit to the computer system presentation instructions that are programmed to cause displaying the user interface with a selectable graphical widget to reinitiate the dictation process; receive a second input from the computer system specifying selection of the graphical widget; in response to the second input, visually erase the previously generated one or more sentences and the one or more enhancements.

13. The media of claim 10, wherein the software is further operable when executed to update the one or more enhancements and the one or more sentences in the user interface in real-time as the audio input is received from the computer system.

14. The media of claim 10, wherein the software is further operable when executed to identify, in the one or more sentence structures using the comprehension model, one or more of a command to generate the one or more sentences, a command to access an email thread, or a command to generate a response to the email thread.

15. The media of claim 10, wherein the software is further operable when executed to generate the one or more sentences by one or more of rearranging the one or more sentence structures, removing one or more words from the sentence structures, or adding one or more additional words to the sentence structures.

16. A system comprising: one or more processors; and a non-transitory memory coupled to the processors comprising instructions executable by the processors, the processors operable when executing the instructions to:

receive, at a user interface of a computer system, a first input to initiate a dictation process;

receive, in response to the initiation of the dictation process, an audio input from the computer system;

convert, using an automatic speech recognition model, the audio input to digitally stored electronic text;

generate, using a normalization model, one or more digitally stored sentence structures based on the text;

identify, using a comprehension model, one or more instructions represented in the one or more digitally stored sentence structures;

generate, using the comprehension model, one or more sentences based on the one or more instructions and the one or more digitally stored sentence structures;

identify, using an enhancement model to analyze the one or more sentences, one or more enhancements to apply to the one or more sentences that alters the one or more sentences; and present, at a display of the computer system, the one or more enhancements near the one or more sentences in the user interface of the computer system, each particular enhancement of the one or more enhancements being selectable via a second input from the computer system to apply the particular enhancement to the one or more sentences.

17. The system of claim 16, wherein the processors are further operable when executed to format and transmit to the computer system presentation instructions that are programmed to cause displaying the user interface with a selectable graphical widget to initiate the dictation process, and receive the first input by receiving a selection of the selectable graphical widget.

18. The system of claim 16, wherein the processors are further operable when executed to format and transmit to the computer system presentation instructions that are programmed to cause displaying the user interface with a selectable graphical widget to reinitiate the dictation process; receive a second input from the computer system specifying selection of the graphical widget; in response to the second input, visually erase the previously generated one or more sentences and the one or more enhancements.

19. The system of claim 16, wherein the processors are further operable when executed to update the one or more enhancements and the one or more sentences in the user interface in real-time as the audio input is received from the computer system.

20. The system of claim 16, wherein the processors are further operable when executed to identify, in the one or more sentence structures using the comprehension model, one or more of a command to generate the one or more sentences, a command to access an email thread, or a command to generate a response to the email thread.

21. The method of claim 1, the comprehension model and the enhancement model being the same model.

22. The media of claim 10, the comprehension model and the enhancement model being the same model.

23. The system of claim 16, the comprehension model and the enhancement model being the same model.

* * * * *